Figure 1:
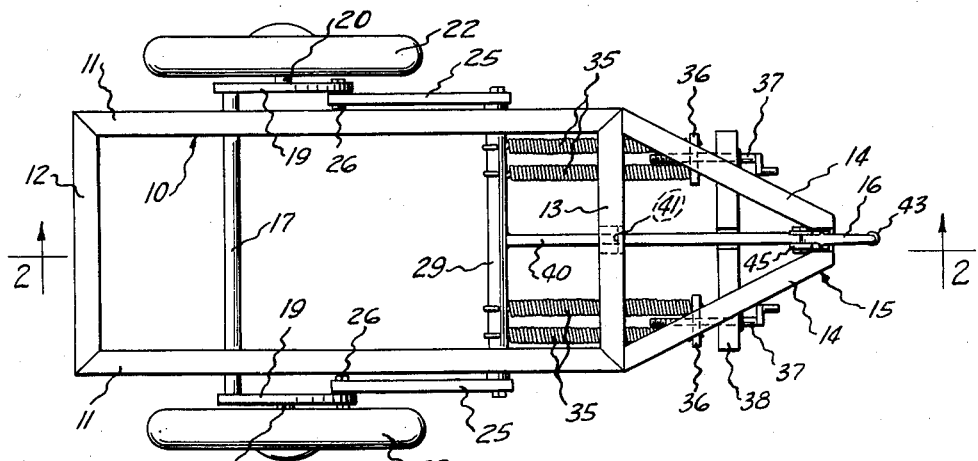

July 18, 1950  G. S. PAINE  2,515,379

VEHICLE SUSPENSION

Filed April 18, 1947  2 Sheets-Sheet 1

GILBERT S. PAINE
INVENTOR.

BY
ATTORNEY

July 18, 1950 G. S. PAINE 2,515,379
VEHICLE SUSPENSION
Filed April 18, 1947 2 Sheets-Sheet 2

GILBERT S. PAINE
INVENTOR.

BY

ATTORNEY

Patented July 18, 1950

2,515,379

UNITED STATES PATENT OFFICE 2,515,379

VEHICLE SUSPENSION

Gilbert S. Paine, Dallas, Tex.

Application April 18, 1947, Serial No. 742,249

7 Claims. (Cl. 280—33.4)

1

This invention relates to new and useful improvements in vehicle suspensions, and more particularly to suspensions for trailer frames.

One object of the invention is to provide an improved vehicle suspension which is so arranged that the frame remains substantially level for all load conditions.

A particular object of the invention is to provide an improved vehicle suspension which is so arranged that the center of gravity of the vehicle is lowered nearer the ground when a heavy load is mounted on the vehicle.

A further object of the invention is to provide in a vehicle suspension, of the character described, means for effectively changing the position of the center of gravity of the load on the vehicle with respect to the wheels of the vehicle, whereby the wheel loading is more evenly adjusted.

Another object of the invention is to provide a vehicle suspension, particularly adapted for two-wheel trailers which are arranged to be hitched to the rear of tractors, automobiles, or other machines, including an offset axle arrangement which permits the center of gravity of the trailer to be lowered under heavy loading conditions and which provides for the transfer of a portion of the heavier load to the rear wheels of the tractor or automobile by effectively changing the position of the center of gravity of the load with respect to the trailer wheels.

A particular object of the invention is to provide an improved two-wheel trailer, adapted to be connected to the rear of a tractor or automobile so as to be drawn thereby, and wherein the axle of the trailer is formed with an offset or crank permitting the trailer frame to be raised or lowered with respect to the center of the trailer wheels, the trailer having a hitch which is automatically operable in conjunction with the off-set axle to maintain the trailer frame and body in a level position for all load conditions.

Still another object of the invention is to provide a trailer of the character described wherein the frame may be moved to and locked in various adjusted positions with respect to the center of the wheels, whereby the center of gravity of the trailer and the load carried thereby may be raised or lowered with respect to the center of the trailer wheels.

A still further object of the invention is to provide in a trailer suspension of the character described adjustable resilient means normally resisting movement of the trailer frame with respect to the wheels of the trailer.

A further object of the invention is to provide, in a trailer suspension of the character described, means for locking the offset stub axles at various desired adjusted positions, whereby the height of the frame may be varied to meet varying loading conditions; said locking means also rendering the resilient restraining means ineffective, if desired.

Yet another object of the invention is to provide a trailer suspension of the character described wherein the trailer hitch and the offset axle of the trailer connected with the hitch permit the load carried by the trailer to act as a shock absorber when the tractor or automobile is started suddenly, whereby spring shock absorbers are substantially eliminated.

Figure 2:
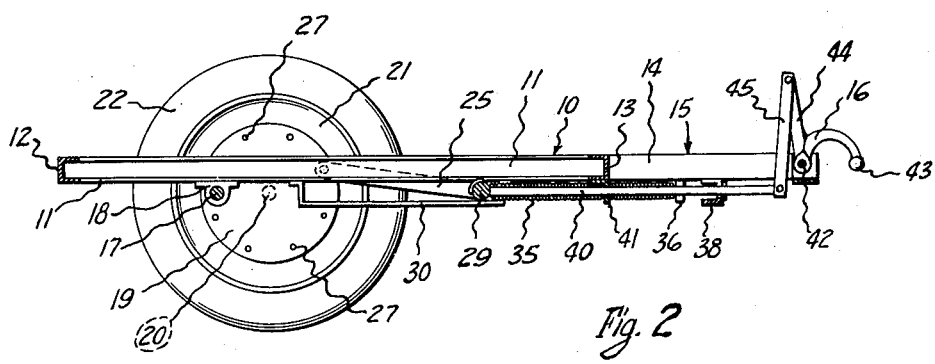
Figure 3:
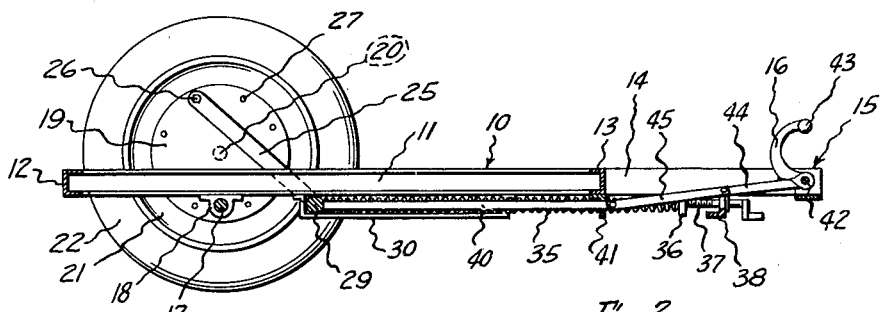
Figure 4:
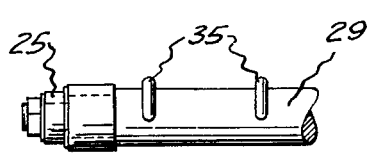
Figure 5:
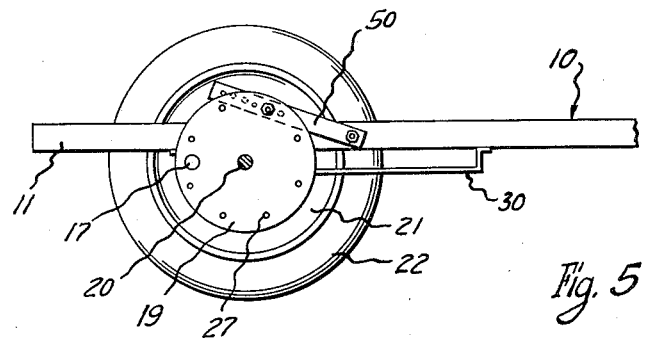
Figure 6:
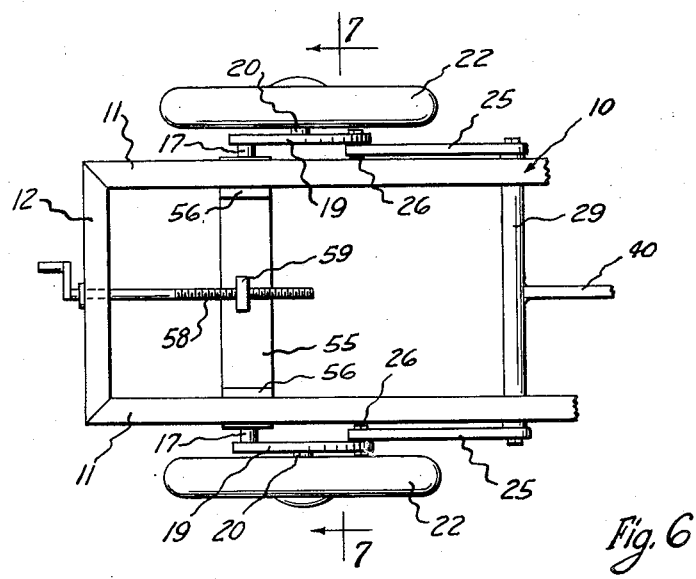
Figure 7:
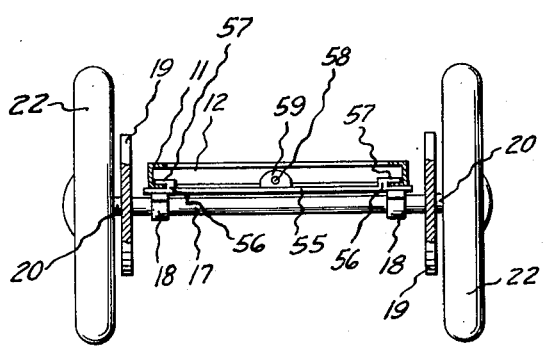

Additional objects and advantages of the invention will readily be apparent from the reading of the following description of a device constructed in accordance with the invention, and reference to the accompanying drawings thereof, wherein:

Figure 1 is a plan view of a trailer frame suspension constructed in accordance with the invention, Figure 2 is a longitudinal vertical sectional view taken on the line 2—2 of Figure 1, and showing the trailer frame in normal elevated position, Figure 3 is a view similar to Figure 2, showing the trailer frame in a lower loaded position, Figure 4 is a fragmentary view of one end of the movable cross-bar connecting the wheel cranks or offset axles with the trailer hitch, Figure 5 is a view partly in elevation and partly in section, illustrating the tie-rods locking the offset axle stubs in adjusted fixed position with respect to the frame, Figure 6 is a plan view of the rear portion of the vehicle illustrating the adjustable mounting for the axle shaft, and Figure 7 is a transverse vertical sectional view taken on the line 7—7 of Figure 6.

In the drawings, the numeral 10 designates generally a substantially rectangular vehicle frame having parallel longitudinal side frame members 11, a rear cross-member 12 and a front frame cross-member 13. The frame members are preferably formed of channel irons having their flanges directed inwardly, but may be of any suitable desired material. A pair of channel members 14, forming inwardly extending or converging forward projections of the side members 11 of the frame, provide a yoke or support 15 for a trailer hitch member 16 by means of which the trailer may be connected to a rear draw bar (not shown) carried by a tractor, automobile or other suitable machine for pulling the trailer.

An elongate axle shaft 17 is rotatably mounted in bearings 18 which are secured to the under side of the rear portion of the longitudinal side frame members of the trailer. A crank throw member, preferably in the form of a flat circular disc 19, is secured at each end of the axle shaft 17, said discs being secured to the shaft near their peripheral edge and positioned at right angles to the axis of the shaft in such a manner that the center of each disc lies in a plane extending through the longitudinal axis of the axle shaft, whereby the centers of the discs are in alignment. One of a pair of stub axle shafts 20 has its inner end secured at the center of each disc 19 and projects at right angles therefrom parallel to the axis of the elongate axle shaft 17, and a wheel 21 having a tire 22 mounted thereon is rotatably secured on each stub axle shaft.

Thus, it will be seen that the stub axles 20 are in axial alignment and that the axle shaft 17 may rotate in the bearings 18, whereby the stub axles may be swung in an arc about the center of the shaft 17 to shift the position of the wheels 21 with respect to the frame 10. Therefore, the position of the frame with respect to the centers of the wheels may be moved from an elevated position, such as is shown in Figure 2, to a lowered position, such as is shown in Figure 3, whereby the center of gravity of the trailer and the load carried thereby may be shifted from the elevated position to the lowered position to increase the stability of the loaded trailer.

For resiliently maintaining the trailer frame in the normal elevated position of Figure 2, each of a pair of connecting or pitman rods 25 has one end pivotally connected to the peripheral edge portion of one of the discs 19 by a bolt 26 extending through one of a plurality of spaced openings 27 formed near the peripheral edge of said disc spaced from the axle shaft 17, and has its other end pivotally connected to a cross-bar 29 which extends transversely of the trailer frame and is movable in a stirrup strap 30 secured to the under side of said frame for guiding the movement of the cross-bar. For resiliently urging the cross-bar toward the front end of the frame, it is preferable that elongate helical tension springs 35 have one end connected to the cross-bar 29 and their other end connected to one of a pair of draw plates 36 which may be adjusted in position by elongate threaded crank screws 37 rotatably mounted in a transverse support channel 38 secured to the under side of the channel members 14 forming the yoke 15 and threaded into said draw plates. It will readily be seen that the crank screws 37 may be rotated to adjust the position of the draw plates 36, whereby the tension of the springs 35 may be adjusted as desired.

The springs act to resiliently restrain the cross-bar 29 in the forward position shown in Figures 1 and 2, whereby the stub axles are swung downwardly toward the front of the trailer frame 10 and the frame is maintained in an elevated position. However, when a load is placed upon the frame 10, the load will cause the frame to be moved downwardly and the wheels on the stub axles 20 to swing upwardly about the center of the axle shaft 17 toward the position illustrated in Figure 3, pulling the cross-bar 29 toward the rear of the frame against the force of the springs 35.

It is to be noted that, since the trailer wheels are mounted on the offset stub axles and must move together because of their rigid inter-connection, any force tending to move one side of the trailer frame downwardly with respect to the wheels will likewise move the other side of the frame downwardly the same distance. Thus, the offset or crank-like wheel mounting provides for maintaining the frame of the trailer parallel to the elongate axle shaft 17 for all load conditions, whereby the frame will not tilt toward one wheel or the other because of an unbalanced lateral loading condition.

An elongate draw-bar 40 has one end connected substantially centrally of the cross-bar 29 and extends forwardly therefrom, through an opening in a guide lug 41 secured to and depending from the center of the under side of the front frame cross member 13, to a point near the trailer hitch 16.

The trailer hitch member 16 is in substantially the form of a bell-crank, having its center pivoted on a bolt 42 extending through the forward ends of the channel members 14 of the yoke 15, and having a universal ball-type connection 43 on one arm by means of which the hitch member may be secured to a socket (not shown) carried by the draw-bar of the tractor, automobile or other pulling machine. The other arm 44 of the crank-like hitch member is connected by means of a link member 45 to the draw-bar 40, whereby movement of the cross-bar 29 causing longitudinal movement of the draw-bar is transmitted through the draw-bar and the link 44 to the hitch member 16.

In use, the ball 43 of the hitch member is connected to the draw-bar (not shown) of the tractor or automobile in the customary manner; the position of the hitch member, with the trailer not loaded, being such that the frame 10 of the trailer is substantially level when the connecting ball 43 is secured to the draw-bar of the tractor or automobile. So long as the trailer remains unloaded, it is obvious that the frame 10 will remain in the level position. However, when a load is placed on the frame of the trailer, the frame will move downwardly, swinging the stub-axles 20 and the disc-like crank throw members 19 upwardly through an arc toward the rear of the frame. This swinging of the crank throw members causes the connecting rods 25 to move the cross-bar 29 toward the rear of the trailer against the tension force of the spring 35; and as the cross-bar is moved rearwardly, the draw-bar 40 is likewise moved longitudinally toward the rear of the trailer. Rearward movement of the draw-bar 40 pulls the link 45 toward the rear of the trailer and swings the arm 44 of the hitch member 16 about the bolt 42 toward the position illustrated in Figure 3. Such movement of the hitch member swings the connecting ball 43 through an arc about the bolt 42 toward the position illustrated in Figure 3, whereby the front end of the trailer frame 10 is also lowered and the frame is maintained in substantially horizontal position regardless of the load placed on said frame.

It will be seen, therefore, that the arrangement of the connecting rods 25, the cross-bar 29, the draw-bar 40, the link 45, and the lengths of the arms of the hitch member 16, is such that when the stub axles 20 are swung through an arc about the elongate axle shaft 17, the hitch connecting ball 43 is likewise swung through a corresponding arc about the bolt 42 to maintain the trailer frame in a level position. The height of the connecting ball 43 above the ground remains substantially constant regardless of the level to which the frame 10 of the trailer is depressed by the load carried by said frame, and the height of the stub axles 20 above the ground obviously remains constant regardless of the position of the trailer frame. Therefore, the trailer frame, in effect, is supported and swung from the stub axles 20 and the connecting ball 43 on links of substantially the same length, whereby the frame is positively maintained level for all positions, from elevated (Figure 2) to lowered (Figure 3).

Furthermore, it will be seen that the lowering of the frame 10 by the load mounted thereon lowers the center of gravity of the trailer and the load, as the frame swings downwardly between the wheels. Also, the frame remains level with respect to the axle and with respect to the ground during this lowering of the effective center of gravity of the trailer under heavy loading conditions.

It will particularly be noted that, as the stub axles 20 swing toward the rear of the frame under a heavy load mounted on the frame, a portion of the heavy load will be effectively transferred to the rear of the pulling vehicle, tractor or automobile. Such effective transfer of a portion of the heavier load to the pulling vehicle is brought about because the effective center of the supporting trailer wheels is moved toward the rear of the trailer, whereby the center of the load is effectively moved farther from the trailer wheels and nearer the pulling vehicle wheels; the transfer being effected automatically by the rearward swinging movement of the offset stub axles 20 about the axle shaft 17 as the frame is depressed by the load.

From the foregoing, it will be seen that the trailer vehicle suspension provides for automatic lowering of the center of gravity of the trailer frame and the load carried thereby, when heavier loads are mounted on the trailer. Such heavier loads simultaneously cause the stub axles to swing rearwardly, in the manner just described, to effectively transfer a portion of the heavier load to the rear wheels of the pulling vehicle. Furthermore, the trailer hitch member is positively actuatable in conjunction with the movement of the offset stub axles to maintain the trailer frame level under all loading conditions, whereby a heavy load on the trailer does not cause the frame to tilt, either from side to side or from front to rear, and the trailer frame remains substantially level for all conditions of load.

If desired, the springs 35 may be rendered inactive by removing or completely loosening them, so that they exert no restraining force upon the cross-bar 29. In such event, a load mounted on the trailer frame will depress the frame to the lowermost position illustrated in Figure 3, the connecting rods 25 acting upon the cross-bar 29 to pull the draw-bar 40 toward the rear of the frame and, in turn, swinging the hitch member connecting ball 43 to the elevated position illustrated in Figure 3. Then, when the automobile, tractor or other pulling machine is started to pull the trailer with the load mounted thereon, the pulling force applied to the connecting ball 43 will tend to swing the crank-like hitch member toward the position shown in Figure 2, and will exert a longitudinal pull upon the draw-bar 40 tending to move the cross-bar 29 toward the front of the frame. Such forward movement of the cross-bar will act through the connecting rods 25 and tend to swing the crank throw discs 19 forwardly and downwardly through an arc toward the position shown in Figure 2, tending to effectively raise the trailer frame 10 against the weight of the load. Therefore, the weight of the load on the frame acts as a shock absorber reducing the shock of starting under heavy load. Manifestly, the same results would obtain if the springs were effective, since the force exerted by the springs acts in the same direction as the pull transmitted to the cross-bar 29 by a pulling force applied to the connecting ball 43 of the hitch member.

It will thus be seen that the improved vehicle suspension also provides for utilizing the weight of the load carried by the frame for absorbing the shock of suddenly starting the vehicle into motion by pulling force applied to the trailer hitch member 16.

Should it be desired to fix the position of the trailer frame 10 with respect to the stub axles 20 and the wheels mounted thereon, one of several openings formed at one end of a tie-rod 50 (Figure 5) may be connected by a bolt to one of the openings 27 near the periphery of the crank throw disc 19, and the tie-rod may have its other end fixedly secured by a bolt to the side frame members 11. Thus, the tie-rods 50 positively prevent swinging movement of the crank throw discs 19 and the wheels mounted on the stub axles 20 carried by said discs, whereby the trailer frame is rigidly held in a fixed position with respect to the stub axles and wheels, irrespective of the load mounted on the trailer. Obviously, the height of the frame may be adjusted to any desired level by selecting the proper openings in the tie-rods 50 and in the crank throw discs. Furthermore, the frame may be locked at the desired height, irrespective of whether or not the springs 35 are acting upon the cross-bar 29; thus, the springs may be rendered entirely ineffective, if desired, by locking the frame in a fixed position by means of the tie-rods.

It is also within the scope of the invention to provide for adjustable mounting of the bearings 18 supporting the elongate axle shaft 17, whereby the axle shaft may be adjusted in position longitudinally of the side frame members 11. In such event, the bearings 18 would be mounted on the under side of a slidable cross member 55, having upstanding lugs 56 with outwardly directed flanges 57 provided thereon for engaging over the lower flange of the channel members forming the side frame members 11, as shown in Figure 7. An elongate adjusting crank screw 58 rotatably mounted in an opening at the center of the rear cross member 12 and threaded into an upstanding adjusting ear 59 formed integral with the slidable cross member 55 provides for adjustment and securing of the slidable cross member to position the bearings 18 and the axle shaft 17 at the desired location longitudinally of the side frame members.

Any suitable desired type of vehicle body may be mounted on the frame 10, the structure of the body forming no part of this invention.

The foregoing description of the invention is explanatory only, and changes in the details of the constructions illustrated may be made by those skilled in the art, within the scope of the appended claims, without departing from the spirit of the invention.

What I claim and desire to secure by Letters Patent is:

1. A vehicle suspension including, a frame, an axle shaft carried by the frame rotatable about its axis and having aligned offset wheel supporting end portions swingable in an arc about the axis of the shaft, whereby the frame may undergo adjustment in height above the ground, a cross-bar movably carried by the frame and connected with the offset axle end portions so as to be moved when said end portions swing in an arc, a swingable hitch member for connecting the frame with a pulling machine, and a draw bar having one end connected to the cross-bar and having its other end connected with the swingable hitch member whereby movement of the offset axle end portions causes corresponding swinging movement of the swingable hitch member to maintain the frame substantially level during adjustment in height of the frame above the ground.

2. A vehicle suspension including, a frame, an axle carried by the frame and having aligned swingable offset wheel carrying end portions whereby the frame may undergo adjustments in height above the ground, a swingable hitch member carried by the frame and adapted to be connected to a pulling machine, and a linkage connecting the offset axle end portions and the swingable hitch member so that movement of the axle end portions causes corresponding swinging movement of the hitch member, whereby the frame is automatically maintained substantially level when the offset axle end portions swing to lower the center of gravity of the frame.

3. A vehicle suspension including, a frame, a wheel carrying axle having integral offset wheel carrying end portions swingable about the longitudinal axis of the axle, a hitch member adapted to be connected to a pulling machine and swingably carried by the frame so as to be movable upwardly and downwardly with respect to said frame, a linkage connecting the swingable hitch member with the offset end portions of the axle for causing automatic cooperative movement of the axle end portions with the hitch member, whereby a horizontal pull exerted by the pulling machine on the hitch member causing movement of the hitch member in a vertical direction causes corresponding movement of the offset axle end portions tending to raise the frame against the weight of the load thereon so that the load on the frame acts as a shock absorber reducing the shock of starting movement of the trailer under heavy load.

4. A vehicle suspension including, a frame, an axle shaft carried by the frame rotatable about its axis and having aligned offset wheel supporting end portions swingable in an arc about the axis of the shaft whereby the frame may undergo adjustment in height above the ground, a cross-bar movably carried by the frame and connected with the offset axle end portions so as to be moved when said end portions swing in an arc, a swingable hitch member for connecting the frame with a pulling machine, a draw bar having one end connected to the cross-bar and having its other end connected with the swingable hitch member whereby movement of the offset axle end portions causes corresponding swinging movement of the swingable hitch member to maintain the frame substantially level during adjustments in height of the frame above the ground, and adjustable yieldable means restraining the offset axle end portions against swinging movement whereby the force opposing swinging movement of said offset end portions may be varied and controlled.

5. A vehicle suspension including, a frame, a cross member movably mounted on the frame and adjustable longitudinally of the frame, an axle shaft carried by said cross member so as to be adjustable in position longitudinally of the frame when the cross member is moved with respect to the frame, said axle shaft being rotatable about its axis and having aligned offset wheel supporting end portions swingable in an arc about the axis of the shaft whereby the frame may undergo adjustment in height above the ground, a cross-bar movably carried by the frame and spaced from the axle and cross member, means connecting said cross-bar with the offset axle end portions whereby said cross-bar is moved longitudinally of the frame when said end portions swing in an arc about the axis of the axle, a swingable hitch member for connecting the frame with a pulling machine, a draw bar having one end connected to the cross-bar and having its other end connected with the swingable hitch member whereby movement of the offset axle end portions causes corresponding swinging movement of the swingable hitch member to maintain the frame substantially level during adjustment in height of the frame above the ground, and resilient means connected with the frame and with the movable cross-bar for restraining arcuate swinging movement of the offset axle end portions whereby the frame is normally resiliently restrained in elevated position and may move to a lower position when a load is carried by the frame, said resilient means resisting such lowering movement of the frame, the adjustable cross member providing for selective adjustment of the position of the axle shaft with respect to the frame to accommodate varying conditions of load, whereby the arc of movement of the offset axle end portions may be properly positioned with respect to the frame and the swingable hitch member to provide for desired proportioning of the load upon the axle and the hitch member.

6. A vehicle suspension of the character set forth in claim 1 wherein, resilient means is connected with the frame and the offset axle end portions for restraining such offset axle end portions against swinging movement, and means is provided for adjusting the force exerted by the resilient restraining means, whereby the force opposing swinging of the offset axle end portions may be varied and controlled.

7. A vehicle suspension including, a frame, a wheel carrying axle having swingable offset wheel carrying end portions, a swingable hitch member carried by the frame and adapted to be connected to a pulling machine for adjustably supporting one end of the frame, the offset axle end portions swinging toward the rear end of the frame when a load is mounted on the frame whereby the center of the load is shifted with respect to the wheels carried by the axle end portions to effectively transfer an increased portion of the load to the pulling machine, and link members connecting the offset axle end portions with the swingable hitch member so that swinging movement of the axle end portions causes corresponding swinging movement of the swingable hitch member to automatically maintain the frame substantially level during adjustments in height of the frame above the ground.

GILBERT S. PAINE.

REFERENCES CITED

The following references are of record in the file of this patent:

UNITED STATES PATENTS

| Number | Name | Date |
|---|---|---|
| 1,691,583 | Pearson | Nov. 13, 1928 |
| 2,059,205 | Buffington | Nov. 3, 1936 |
| 2,179,477 | Berendsen | Nov. 14, 1939 |
| 2,196,338 | McDaniel | Apr. 9, 1940 |
| 2,227,762 | Ronning | Jan. 7, 1941 |
| 2,297,992 | Swim | Oct. 6, 1942 |
| 2,365,884 | Kucera | Dec. 26, 1944 |